No. 644,983. Patented Mar. 6, 1900.
R. F. C. KEATS.
SPEED GOVERNOR FOR ENGINES.
(Application filed Nov. 14, 1898.)

(No Model.)

Witnesses

Inventor
Robert F. C. Keats,
By James L. Norris.
Atty

THE NORRIS PETERS CO., PHOTO-LITHO., WASHINGTON, D. C.

UNITED STATES PATENT OFFICE.

ROBERT FORD COURTENAY KEATS, OF PORTSMOUTH, ENGLAND, ASSIGNOR TO BERTRAM CHARLES ELLIOT, OF CHELSEA, ENGLAND.

SPEED-GOVERNOR FOR ENGINES.

SPECIFICATION forming part of Letters Patent No. 644,983, dated March 6, 1900.

Application filed November 14, 1898. Serial No. 696,426. (No model.)

*To all whom it may concern:*

Be it known that I, ROBERT FORD COURTENAY KEATS, mechanical engineer, a subject of the Queen of Great Britain, residing at 9 Garnier street, Portsmouth, in the county of Hants, England, have invented certain new and useful Improvements in or Relating to Speed-Governors for Engines, (for which an application for patent has been filed in Great Britain on the 26th of July, 1898, No. 16,300;) and I do hereby declare the following to be a full, clear, and exact description of the invention, such as will enable others skilled in the art to which it appertains to make and use the same.

Figure 1:
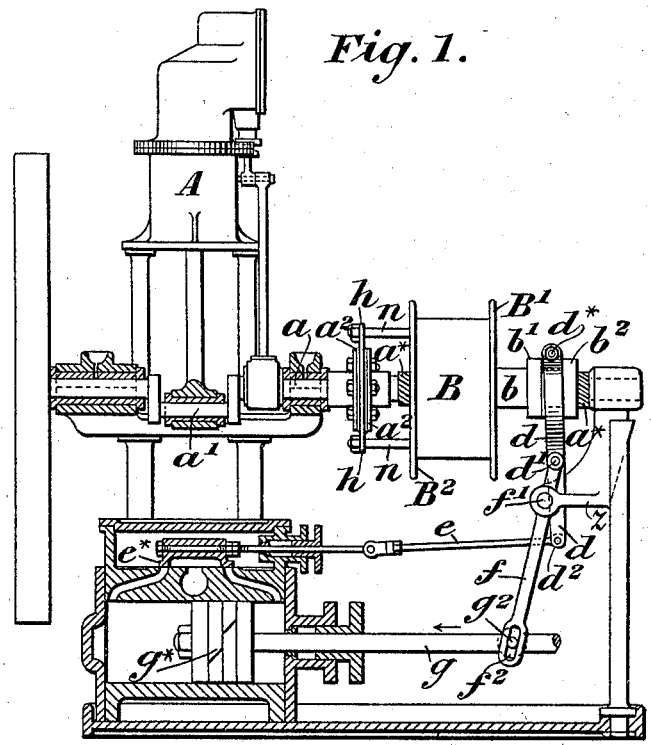
Figure 2:
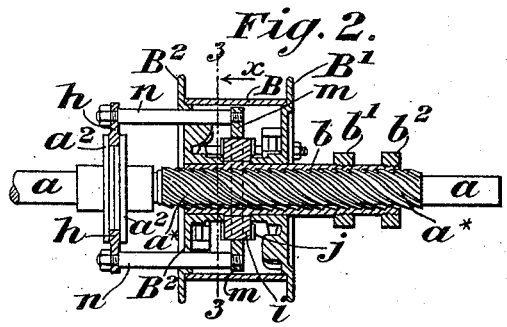
Figure 3:
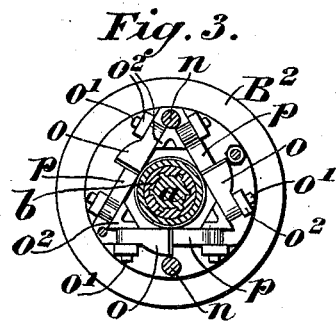
Figure 4:
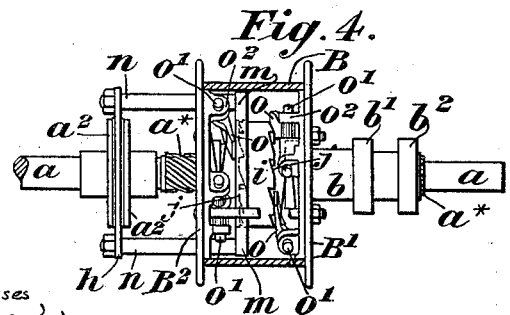
Figure 5:
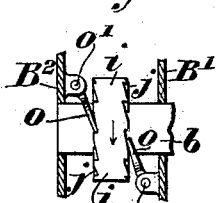

This invention consists of improvements in or relating to governors or apparatus for regulating the speed of marine or other engines, and I will proceed to fully describe same with reference to the accompanying drawings, as follows:

Figure 1 is a view in elevation, partly in section, of the apparatus according to the present invention. Fig. 2 is a "local" longitudinal section, on an enlarged scale, showing the disengaging mechanism according to this invention, the apparatus being in mid-position. Fig. 3 is a view on the line 3 3, Fig. 2, looking in the direction of the arrow $x$. Fig. 4 is a view in elevation of Fig. 2, only with the cylindrical part of the pulley B removed to show the interior mechanism in the extreme position. Fig. 5 is a detail view of part of the interior mechanism, as hereinafter explained.

For the sake of example I have illustrated and will describe my invention as carried into practice for governing marine steam-engines, although I wish it clearly understood that same may be used for any other engines or motors (steam or otherwise) to which same may be applicable.

A is an auxiliary or separate small steam-engine, which I term the "controlling-engine," by which the crank $a'$ of the shaft $a$ is revolved at any desired speed, said shaft being screw-threaded at $a^*$.

B is a pulley adapted to be driven by an endless belt from or operated by the main engine to be governed, this pulley B being detachably affixed to the long internally-screw-threaded sleeve or, as I term it, "nut" $b$ in such wise that normally said pulley B and nut $b$ are locked together and cannot revolve independently of one another except in certain extreme positions, when they (the pulley B and the nut $b$) are automatically disengaged from one another, as hereinafter described. In the space or channel between the two flanges $b'$ $b^2$, fixed or formed on the nut $b$, a collar (not shown) or equivalent is mounted, carried in and by the upper forked end $d^*$ of the lever $d$, so that any movement of the nut $b$ (in the direction of the longitudinal axis of said shaft $a$) will thereby be imparted through said collar to the forked end $d^*$ of said lever $d$, and thereby to the latter. The lever $d$ is pivoted at $d'$ to the lever-arm $f$ and is also pivoted at $d^2$ to the valve-rod $e$ of an auxiliary engine for operating the throttle-valve or valve-gear of the main engine. The aforesaid lever $f$ is pivoted at $f'$ to the fixed frame $z$ and at its other end is connected to the piston-rod $g$ (of said valve-operating engine) by means of the pin $g^2$ on said rod $g$, which works in the slot $f^2$ of the said lever $f$.

The shaft $a$ and screw-threaded part $a^*$ thereof are connected up rigidly through and by means of the two disks $a^3$, (one of which is rigidly fixed to or formed on the shaft $a$ and the other on the screw-threaded part $a^*$,) which disks $a^2$ are bolted together, as shown in Fig. 1, so that the crank $a'$, crank-shaft $a$, disks $a^2$, and screws $a^*$ are all rigidly connected up practically as one part, (which I shall hereinafter refer to as the "screw" $a$,) a washer or means being provided to hold said disks $a^2$ a sufficient distance apart to receive and hold between same the ring washer or collar $h$, which latter is held between said disks $a^2$ to prevent lateral movement of the collar $h$, but so that the latter is free to revolve (or not) quite independently of the said disks $a^2$.

The exterior of the nut $b$ has formed thereon or fixed rigidly thereto a circular ratchet wheel or wheels. For instance, I have illustrated a double-faced circular ratchet or wheel $i$, having lateral teeth—i. e., ratchet-teeth—formed on each face $j$ thereof, the teeth $j$ on one face of such circular ratchet being oppositely arranged to the teeth on the other face. (See Fig. 5.) The periphery of this circular ratchet device $i$ is cylindrical and smooth, (see Fig. 5,) and over this is slid the disengaging-ring $m$, which surrounds said drum or cylinder $i$, but is quite free to either revolve or slide lengthwise thereon, this ring $m$ being connected by the rods $n$ (which pass freely through the side cheeks $B^2$ of the pulley B) to the aforesaid collar $h$, held between the disks $a^2$, and thus the ring or collar $m$ is always held in a fixed position—i. e., always the same distance apart from the disks $a^2$ and collar $h$—and therefore it follows that the disengaging-ring $m$ is always maintained in the same position relative to the screw $a^*$. The nut $b$ is screwed on said screw $a^*$, on which it is free to screw along in either direction within certain limits, and when in its (the nut's) normal or mid position the said circular ratchet $i$, carried on said nut $b$, would be in mid-position—i. e., exactly central or thereabout—within said ring $m$, as shown in Fig. 2.

The pulley B, as shown in the drawings, is constructed with the cylindrical portion and one side cheek $B'$ all in one part, and the other side cheek $B^2$ arranged and adapted to be bolted thereto, so as thus to make B, $B'$, and $B^2$ practically all one part when put together, each side cheek separate or combined being adapted to revolve upon the exterior of the nut $b$ and independently thereof. On the inside face of each side cheek $B'$ and $B^2$, respectively, I arrange and mount one or more pawls—for instance, three pawls $o$, as illustrated in the drawings, arranged in a ring concentrically around and pivoted at $o'$ to the lugs $o^2$ on the inside face of the side cheek $B^2$, as shown at Fig. 3, and similar pawls $o$ are mounted upon the inside face of the other side cheek $B'$. (See Figs. 4 and 5.)

$p\ p$ are springs attached to the inside face of said side cheeks $B'\ B^2$, which normally press said pawls $o$ away from the side cheek on which same are mounted, the movement of each said pawl $o$ on its pivot $o'$ being limited by any suitable means, such as forming the pivoted end of said pawl $o$ to bear against the inside face of said side cheek at the desired limit of movement of said pawls $o$.

When the parts are all in mid-position, as shown in Fig. 2, then the pawls $o$ on both side cheeks $B'$ and $B^2$ are by the springs $p$ forced against the ratchet-faces $j$ on the ratchet-wheel $i$—that is to say, all the pawls are in action or ready for action—and therefore whichever way the pulley B be turned thereby one pawl or set of pawls $o$ on one side of the ratchet-wheel $i$ will gear with the lateral teeth on one face of the latter, and thereby remove same, and consequently the nut $b$ will be revolved therewith—that is, if the nut $b$ be revolved in either direction it will through said ratchet-wheel $i$ and pawls $o$ thereby revolve the pulley B.

As will be seen, (particularly in Fig. 3,) the pawls $o$ are rather wide and so arranged that part of the end of each said pawl $o$ lies in a circle of the same diameter as said circular ratchet-teeth $j$, while the other part of said pawls $o$ lies in a circle of larger diameter—that is, they lie in a circle of the same diameter as the diameter of the disengaging-ring $m$, (see Fig. 4,) so that when the pulley B and with it the pawls $o$ are moved longitudinally with respect to said screw $a$ thereby at the limit of the travel of said pulley B and nut $b$ the outer parts of the pawls are pressed against the fixed disengaging-ring $m$, (see Fig. 4,) whereby the pawls $o$ are thereby forced back and held out of gear with the ratchet-teeth $j$, and consequently the nut $b$ and pulley B are now freed and disengaged from one another, the pawls on the other face running idle over the oppositely-disposed ratchet-teeth.

The operation is as follows: The governing-engine A is set to revolve the screw $a$ at precisely the same speed as the main engine (at its normal speed) revolves the nut $b$, (on said screw $a$,) and thus the nut $b$ and screw $a$ (although independently revolved from different and independent sources of power, as aforesaid) are exactly evenly revolved together and the nut $b$ maintains its normal or mid position with respect to the screw $a$. If now, however, the main engine begins to race or increase its speed, consequently the speed of the pulley B and nut $b$ is accelerated, and directly any differentiation of speed occurs between the nut $b$ and the screw $a$ the nut is thereby caused to travel along the screw, and consequently the lever $d$ is thereby operated and the steam shut off or partially shut off and "racing" prevented, while the aforesaid disengaging mechanism comes into play to release the pulley B from the nut $b$ before the parts $a$ and $b$ could become locked together, the parts reëngaging themselves and acting entirely automatically. Thus the said governing-engine A can be set to regulate the main engine at any desired speed, and by reducing the speed of the governing-engine the speed of the main engine will be correspondingly reduced and then controlled and governed as before in the event of any racing.

In Fig. 1 of the drawings I have illustrated a method and means which I have invented to facilitate the action of the governors and to operate the main-engine throttle-valve or valve-gear, so as to make said governor very "sensitive," as follows: When the forked end $d^*$ of the lever $d$ is operated by the longitudinal movement of the nut $b$ along the shaft $a\ a^*$, as aforesaid, at such moment the lever $f$ is held rigid and the point $d'$ is a temporary fixed point on which the lever $d$ pivots or turns, and thereby the valve-rod $e$ (and with it the valve $e^*$) is moved in or out, and thus steam is admitted to one side of the piston $g^*$ of the aforesaid auxiliary main valve-operating engine, whereby the piston-rod $g$ is moved in or out, and thereby the main-engine throttle-valve or valve-gear is operated, while at same time the lever $f$ is turned on its permanent fixed point $f'$, and as the forked end $d^*$ between the flanges $b'$ $b^2$ is now a temporary fixed point consequently the upper end of the lever $f$ (where same is pivoted at $d'$ to the said lever $d$) will move said lever $d$, and thus move back the valve-rod $e$ and valve $e^*$, and the parts are now all in position again ready for the next movement of the nut $b$, as before, and so on.

It will be obvious that, if desired, I may use the governor without necessarily employing the auxiliary engine for operating the main throttle-valve and system of levers and connections $e, f$, and $g$, and instead thereof I may operate the main-engine throttle-valve or valve-gear by direct connections from the lever $d$ or otherwise directly or indirectly operate the main-engine throttle-valve or valve-gear.

For governing twin-screw engines I arrange and mount a separate governor according to my present invention for each engine, respectively, and to equalize or regulate the speed of the two separate sets of engines I couple together (advantageously by means of a coupling which can be readily uncoupled) the shaft $a$ of each said governor. For instance, where the twin main engines are separated by a longitudinal bulkhead I pass a short intermediate length of shaft through said bulkhead and couple each end thereof to the shaft $a$ of said governor on each side of said bulkhead, the action of each of the governors being perfectly free to govern its own engine should same have any tendency to race, &c., independently of the other engine, while at same time such coupled-up governors would have the effect of synchronizing the speed of the two engines.

Having now particularly described and ascertained the nature of my said invention and in what manner the same is to be performed, I declare that what I claim is—

1. In a steam-engine governor, the combination with a governing-engine and a shaft rotated thereby, of a sleeve having a screw-threaded connection with said shaft, a pulley loosely mounted on said sleeve and driven from the engine to be governed, a clutch connection between said pulley and sleeve and means for controlling the valve mechanism of the engine to be governed, the same being thrown into operation by the longitudinal movement of said pulley on said shaft caused by a variation in the speed of the governing-engine and the engine to be governed.

2. In a steam-engine governor, the combination with a governing-engine and a shaft rotated thereby, of a sleeve having a screw-threaded connection with said shaft, a pulley loosely mounted on said sleeve and driven from the engine to be governed, a clutch connection between said pulley and sleeve, an engine for controlling the valve mechanism of the engine to be governed, and means actuated by the longitudinal movement of said pulley on said shaft for operating the valve of the controlling-engine, said longitudinal movement of said pulley being caused by a variation in the speed of the governing-engine and the engine to be governed.

3. In a steam-engine governor, the combination with a governing-engine and a shaft rotated thereby having screw-threads thereon, of a sleeve having internal screw-threads thereon meshing with the screw-threads on said shaft, a ratchet-wheel secured to said sleeve having two sets of oppositely-extending ratchet-teeth thereon, a pulley loosely mounted on said sleeve driven from the engine to be governed, pawls secured to said pulley engaging, respectively, the two sets of teeth on said ratchet-wheel, means for controlling the valve mechanism of the engine to be governed, and means actuated by the longitudinal movement of said pulley on said shaft, caused by a variation in the speed of the controlling-engine and the engine to be governed, for throwing into operation said controlling means.

4. In a steam-engine governor, the combination with a governing-engine and a shaft rotated thereby having screw-threads thereon, of a sleeve having internal screw-threads thereon meshing with the screw-threads on said shaft, a ratchet-wheel secured to said sleeve having two sets of oppositely-extending ratchet-teeth thereon, a pulley loosely mounted on said sleeve driven from the engine to be governed, pawls secured to said shaft engaging, respectively, the two sets of teeth on said ratchet-wheel, means for controlling the valve mechanism of the engine to be governed, means actuated by the longitudinal movement of said pulley on said shaft, caused by a variation in the speed of the controlling-engine and the engine to be governed, for throwing into operation said controlling means, and means for disengaging said pawls from said ratchet-teeth when said pulley has reached the limit of its movement in one direction or the other.

5. In a steam-engine governor, the combination with a controlling-engine and a shaft rotated thereby having screw-threads thereon, of a sleeve having internal screw-threads thereon meshing with the threads on said shaft, a ratchet-wheel secured to said sleeve having two sets of oppositely-extending teeth thereon, a hollow pulley loosely mounted on said sleeve and driven from the engine to be governed, spring-actuated pawls engaging, respectively the two sets of teeth on said ratchet-wheel, and having lateral projections, a disengaging-ring for said pawl embracing said ratchet-wheel and adapted to engage the lateral projections on said pawls, controlling means for the valve mechanism of the engine to be governed, and means actuated by the longitudinal movement of said pulley on said shaft, caused by a variation in the speed of the governing-engine and the engine to be governed, for throwing said controlling means into operation and for releasing the pawls which are in engagement with the teeth on said ratchet-wheel when said pulley has reached the limit of its longitudinal movement in one direction or the other.

6. In a steam-engine governor, the combination with a governing-engine, a shaft rotated thereby, a sleeve on said shaft, a pulley on said sleeve driven by the engine to be governed, and means thrown into operation by a variation in the speed of said governing-engine and the engine to be governed for causing the longitudinal movement of said pulley and sleeve on said shaft, of a controlling-engine for the valve mechanism of the engine to be governed, a pitman connected to the stem of the valve of said controlling-engine, a lever attached to said rotary shaft and pivoted to said pitman, and a lever fulcrumed upon a fixed part pivoted at one end to said lever and connected, with provision for a small degree of lost motion, with the piston-rod of the piston of said controlling-engine, as and for the purpose set forth.

In testimony whereof I affix my signature in presence of two witnesses.

ROBERT FORD COURTENAY KEATS.

Witnesses:
J. E. PINK,
D. C. COLCLOUGH.